United States Patent
Vinciarelli et al.

(10) Patent No.: US 7,233,469 B2
(45) Date of Patent: Jun. 19, 2007

(54) COMPONENTS HAVING ACTIVELY CONTROLLED CIRCUIT ELEMENTS

(75) Inventors: Patrizio Vinciarelli, Boston, MA (US); Jay Prager, Groton, MA (US)

(73) Assignee: VLT, Inc., Sunnyvale, CA (US)

( * ) Notice: Subject to any disclaimer, the term of this patent is extended or adjusted under 35 U.S.C. 154(b) by 169 days.

(21) Appl. No.: 10/778,629

(22) Filed: Feb. 13, 2004

(65) Prior Publication Data

US 2004/0160714 A1 Aug. 19, 2004

Related U.S. Application Data

(62) Division of application No. 09/841,471, filed on Apr. 24, 2001, now abandoned.

(51) Int. Cl.
- H02H 3/26 (2006.01)
- G05F 1/40 (2006.01)
- H03B 1/00 (2006.01)

(52) U.S. Cl. .................. 361/78; 323/282; 327/552
(58) Field of Classification Search .............. 361/78; 323/282, 283; 327/552
See application file for complete search history.

(56) References Cited

U.S. PATENT DOCUMENTS

| | | | | |
|---|---|---|---|---|
| 3,305,767 A * | 2/1967 | Beihl et al. | ................ | 323/282 |
| 3,638,103 A * | 1/1972 | Birchenough | ................ | 323/289 |
| 4,774,634 A * | 9/1988 | Tate et al. | ................ | 361/760 |
| 4,983,905 A | 1/1991 | Sano et al. | ................ | 323/274 |
| 5,408,173 A | 4/1995 | Knapp | ................ | 323/285 |
| 5,470,343 A | 11/1995 | Fincke et al. | ................ | 607/5 |
| 5,485,077 A | 1/1996 | Werrbach | ................ | 323/286 |
| 5,563,501 A | 10/1996 | Chan | ................ | 323/282 |
| 5,686,821 A | 11/1997 | Brokaw | ................ | 323/273 |
| 5,734,259 A * | 3/1998 | Sisson et al. | ................ | 323/282 |
| 5,777,462 A | 7/1998 | Yue | ................ | 323/285 |
| 5,945,816 A * | 8/1999 | Marusik | ................ | 323/273 |
| 6,313,690 B1 * | 11/2001 | Ohshima | ................ | 327/427 |
| 6,369,555 B2 * | 4/2002 | Rincon-Mora | ................ | 323/282 |
| 6,489,755 B1 * | 12/2002 | Boudreaux et al. | ................ | 323/282 |
| 6,525,596 B2 | 2/2003 | Hosono et al. | ................ | 327/540 |
| 6,626,011 B2 | 9/2003 | Chiquet | ................ | 65/388 |
| 6,642,672 B2 | 11/2003 | Hu et al. | ................ | 315/276 |
| 6,775,257 B1 | 8/2004 | Watanabe | ................ | 370/335 |

FOREIGN PATENT DOCUMENTS

| | | |
|---|---|---|
| JP | 59-170915 | 9/1984 |
| JP | 02-077138 | 3/1990 |
| JP | 08-308093 | 11/1996 |
| JP | 09-008075 | 1/1997 |
| JP | 11-289690 | 10/1999 |
| JP | 03-293924 | 12/1999 |

(Continued)

OTHER PUBLICATIONS

"LM195/LM395 Ultra Reliable Power Transistors," 2000 National Semiconductor Corporation, Jul. 2000, pp. 1-13.

(Continued)

Primary Examiner—Stephen W. Jackson
Assistant Examiner—Boris Benenson
(74) Attorney, Agent, or Firm—Fish & Richardson P.C.

(57) ABSTRACT

Protection and filtering functions are provided for external circuits by internal circuits that use controlled elements.

26 Claims, 9 Drawing Sheets

FOREIGN PATENT DOCUMENTS

Figure 1:
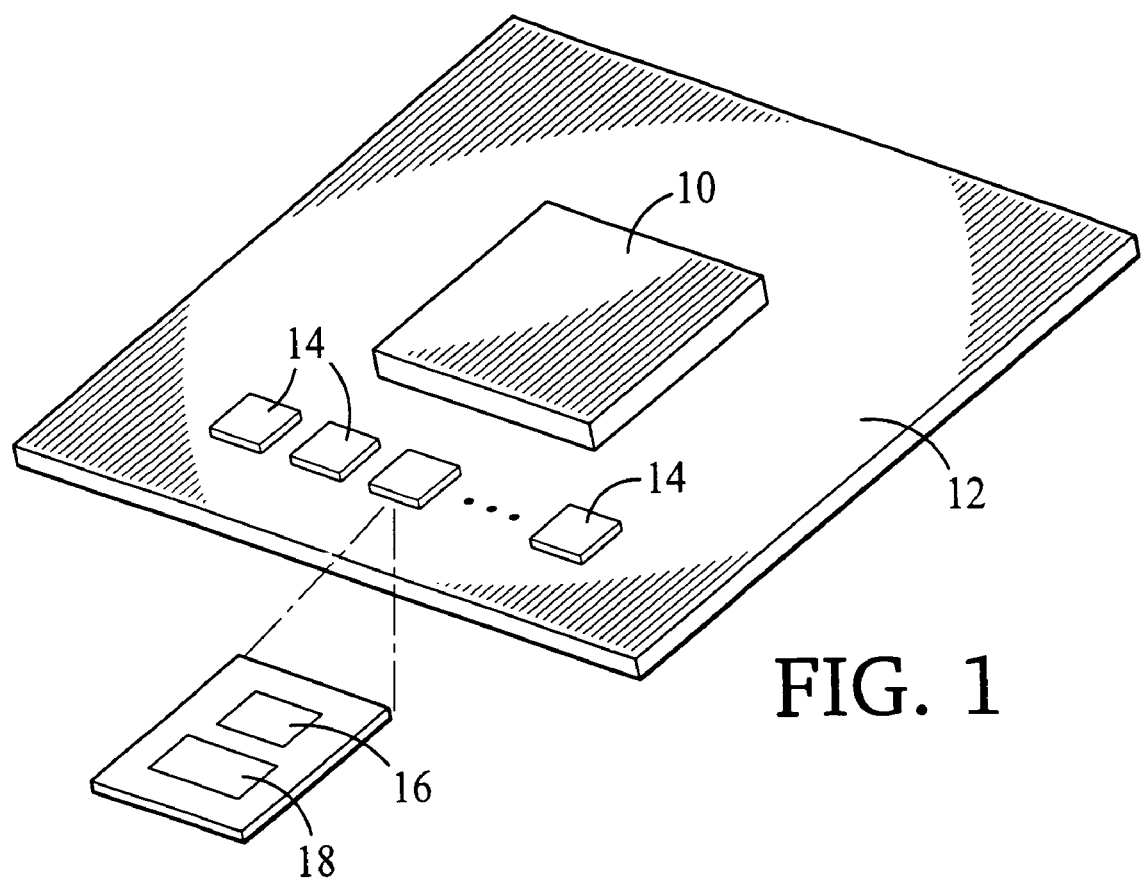

| | | |
|---|---|---|
| JP | 2000-269403 | 9/2000 |
| JP | 2000-299927 | 10/2000 |

OTHER PUBLICATIONS

"Fast IC Power Transistor with Thermal Protection," 2002 National Semiconductor Corporation, Application Note 110, Apr. 1998, pp. 1-9.

"TPS2010, TPS2011, TPS2012, TPS2013 Power-Distribution," Texas Instruments, Dec. 1994 - Revised Aug. 1995, pp. 1-17.

"Add Kelvin Sensing and Parallel Capability to 3-Terminal Regulators," 2002 National Semiconductor Corporation, Linear Brief 51, Mar. 1981, 2 pages.

Notice of Reason for Rejection received from Japanese Patent Office, Mar. 5, 2007.

* cited by examiner

COMPONENTS HAVING ACTIVELY CONTROLLED CIRCUIT ELEMENTS

This application is a divisional of U.S. application Ser. No. 09/841,471, filed Apr. 24, 2001 now abandoned.

BACKGROUND

This invention relates to electronic components having actively controlled circuit elements.

The interconnected electronic components that form many electronic circuits include simple, passive elements, like resistors and capacitors, and more complex actively controlled circuit elements that provide logic and control functions. One example of an actively controlled circuit element is a MOSFET, which can he controlled to perform a switching function (e.g., turned on and off) or controlled in a linear fashion (e.g., the voltage across the MOSFET and/or the current flowing in the MOSFET are controlled over a continuous range of values).

The elements of an electronic component may be formed as regions of material on a substrate as part of an integrated circuit. Or the elements may be commercially available discrete devices (both passive and active) mounted on a circuit board using either conventional soldered leads or surface mounted contact pads.

The resulting electronic components may be packaged in housings or cases that have terminals for making electrical connection to electronic circuits. The terminals of the components can be in the form of leads or surface mounting contact pads.

Micro-lead packaging (MLP) techniques can be used to house integrated circuits and discrete devices in tiny, inexpensive electronic packages that are not much larger than the devices within them and that are easily mounted on circuit boards. Heat can easily and economically be removed from power-dissipating devices that are packaged in MLP packages (see, e.g., U.S. patent application Ser. No. 09/643,159, "Power Converter Assembly", filed Aug. 21, 2000, incorporated by reference).

Some electronic components can be thought of as serving secondary or service functions for other, primary circuits. For example, a power converter circuit may be considered a primary circuit while a ripple filter component connected to the output of the converter may be viewed as providing a secondary or service function.

Sometimes the service functions are provided by including them directly in the primary circuit. In other cases, when the primary circuits are sold as commercial products without inclusion of the service functions, the service functions may be provided by components that are sold and mounted separately.

For example, a commercially available DC-to-DC power converter will typically include ripple filtering circuitry. However, certain applications require very low ripple, and the additional filtering requirements may be met by providing an add-on commercial product that is connected to the output terminal of the converter. One example of such a secondary product is the VI-RAM Ripple Attenuator Module ("RAM") available from Vicor Corporation of Andover, Mass., which serves as an active ripple filter at the output of a switching power converter, such as the VI-200 and VI-J00 families of converters sold by Vicor. The filter function of the RAM is provided by a combination of a linear MOSFET element connected between the output of the power converter and the load and an integrated circuit that actively controls the MOSFET to cancel the ripple at the output of the power converter as a way of reducing ripple at the load.

SUMMARY

In general, in one aspect, the invention features apparatus that includes two or more electronic components, each of the components having (a) an internal circuit having a controlled element and a control element, and (b) terminals coupled to the internal circuit and adapted for surface mounting on a circuit board. The internal circuits of the components are adapted to be connected in parallel through one of the terminals of each of the internal circuits to a common point of an external circuit and to cooperatively protect the external circuit against occurrence of an adverse electrical event. None of the electronic components has ratings sufficient by itself to protect the external circuit.

Implementations of the invention may include one or more of the following features. The event is a loss of a source of power for the external circuit or a sudden change in a voltage at a point of load of the external circuit. The controlled element is a FET. The internal circuit is adapted to detect a current reversal in a path between a power source and the external circuit, and the controlled element is controlled to disconnect the power source from the external circuit in response to the detection. The internal circuits are connected in parallel between a single power source and the external circuit.

Each of the internal circuits includes a voltage generator adapted to derive power from an external source and to provide a voltage to drive the internal circuit. Each of the internal circuits includes a comparator that compares the voltages at the common point and at another point to determine when a current has reversed. The FET and a control circuit are formed on a single integrated substrate, or they may comprise discrete components mounted on a single substrate. The FET, the control circuit, and the terminals are part of a micro-lead package. The internal circuit includes elements adapted to pull up a voltage at one of the terminals when the voltage at the terminal drops and elements adapted to pull down the voltage at the one of the terminals when the voltage at the terminal rises. The elements include a DC-to-DC converter.

Implementations of the invention include one or more of the following features. The external circuit comprises a power converter, and the filtering function comprises a ripple filtering of a power converter. The filtering function comprises attenuating the ripple generated at the output or input of the converter. The controlled element comprises a FET the conductivity of which is controlled to provide the filtering function. The control element includes elements adapted to detect a component of ripple at one of the terminals. The controlled element comprises a MOSFET, and the average voltage across the MOSFET is controlled to be greater than the peak-to-peak variation in the ripple. The control regime includes regulating the voltage variations across the FET to effect ripple attenuation. The apparatus includes terminals coupled to the apparatus and adapted for surface mounting on a circuit board.

In general, in another aspect, the invention features apparatus that includes (a) a protection circuit, and (b) terminals for connecting the protection circuit respectively to a power source and to an external circuit that is to be powered by the source and protected by the protection circuit against an occurrence of an electrical event. The protection circuit is connected to provide two different kinds of protection for the external circuit using two controlled elements.

Implementations of the invention may include one or more of the following features. The protection circuit includes two protection mechanisms connected in series between the source and the external circuit. The protection mechanisms include two FETs connected in series in a common drain configuration or a common source configuration. The protection circuit comprises two protection mechanisms connected across an external circuit. The protection mechanisms include a FET. The protection mechanism shunts current away from the external circuit. A protection mechanism delivers current to the external circuit. The protection mechanism shunts current to ground. The apparatus comprises an energy reservoir at a predetermined voltage, and the protection mechanism shunts current to the energy reservoir or delivers current to the energy reservoir.

In general, in another aspect, the invention features a method that includes setting an average voltage across a series pass element of an active filter based upon variations in a signal that is to be filtered. In implementations of the invention, the peak-to-peak variations in the signal to be filtered are measured, and the average voltage is set to be slightly higher than the peak-to-peak variations.

Other advantages and features of the invention will become apparent from the following description and from the claims.

DESCRIPTION

Figure 2:
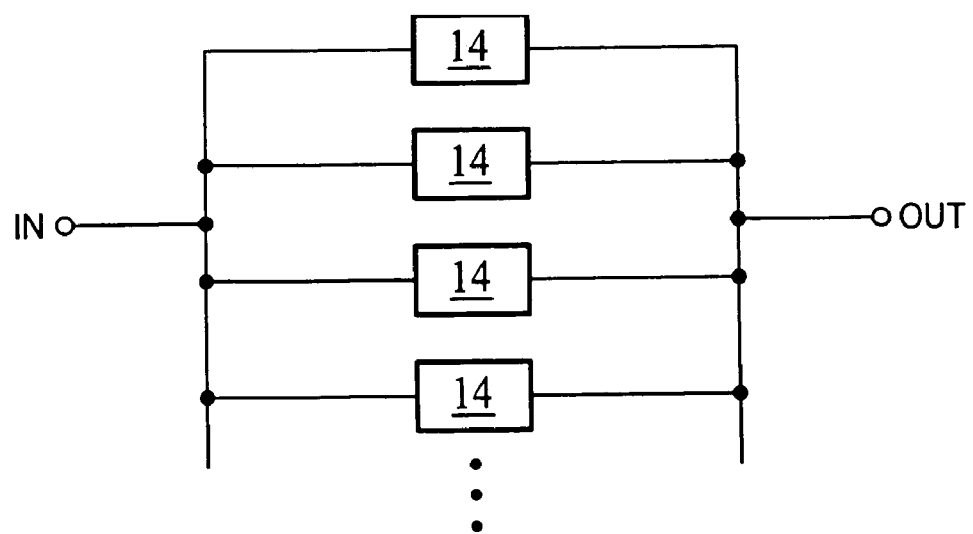

FIG. 1 shows a circuit board.
FIG. 2 shows parallel connection of components.
FIGS. 3 through 16 show protection components.
FIGS. 17 through 21 show filter components.

As shown in FIG. 1, a service or secondary function can be provided as an electronic component 14 that operates in conjunction with a primary circuit 10 mounted on a board 12. In some cases, the secondary function is provided by an appropriate number of parallel-connected, small, low-priced electronic components 14 that include controlled elements 16, that are governed by active control circuits 18.

The primary circuit 10 may have a wide variety of purposes and the electronic components 14 may provide a broad range of secondary functions or services to the primary circuit. Two classes of secondary functions and services are circuit protection and filtering.

Protection Components

Short Circuit Protection

Figure 3:
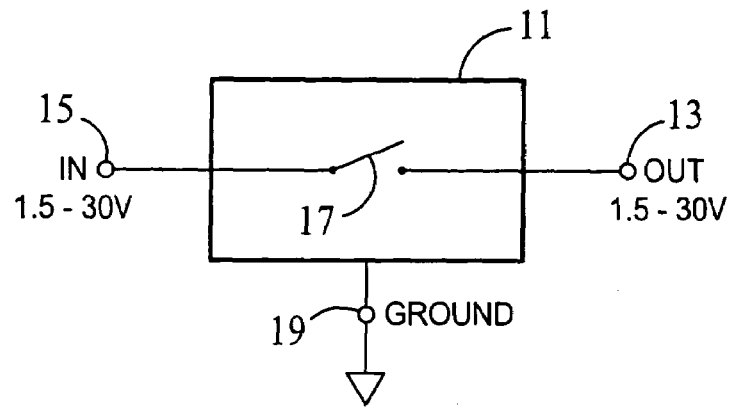

As shown in an idealized form in FIG. 3, one kind of electronic component 11 includes a controlled element 17 to provide a short circuit protection function for a primary circuit (not shown) that is connected to an output 13 and is powered from a DC voltage source (say, between 1.5 and 100 volts, not shown) connected to an input 15. A third terminal 19 is grounded.

The short circuit protection function is provided by detecting when too large a current is being drawn at output 13 and either opening the controlled element 17 quickly enough to avoid damage to the protected circuit or linearly controlling the controlled element to limit the current flow to some value or range of values.

Figure 4:
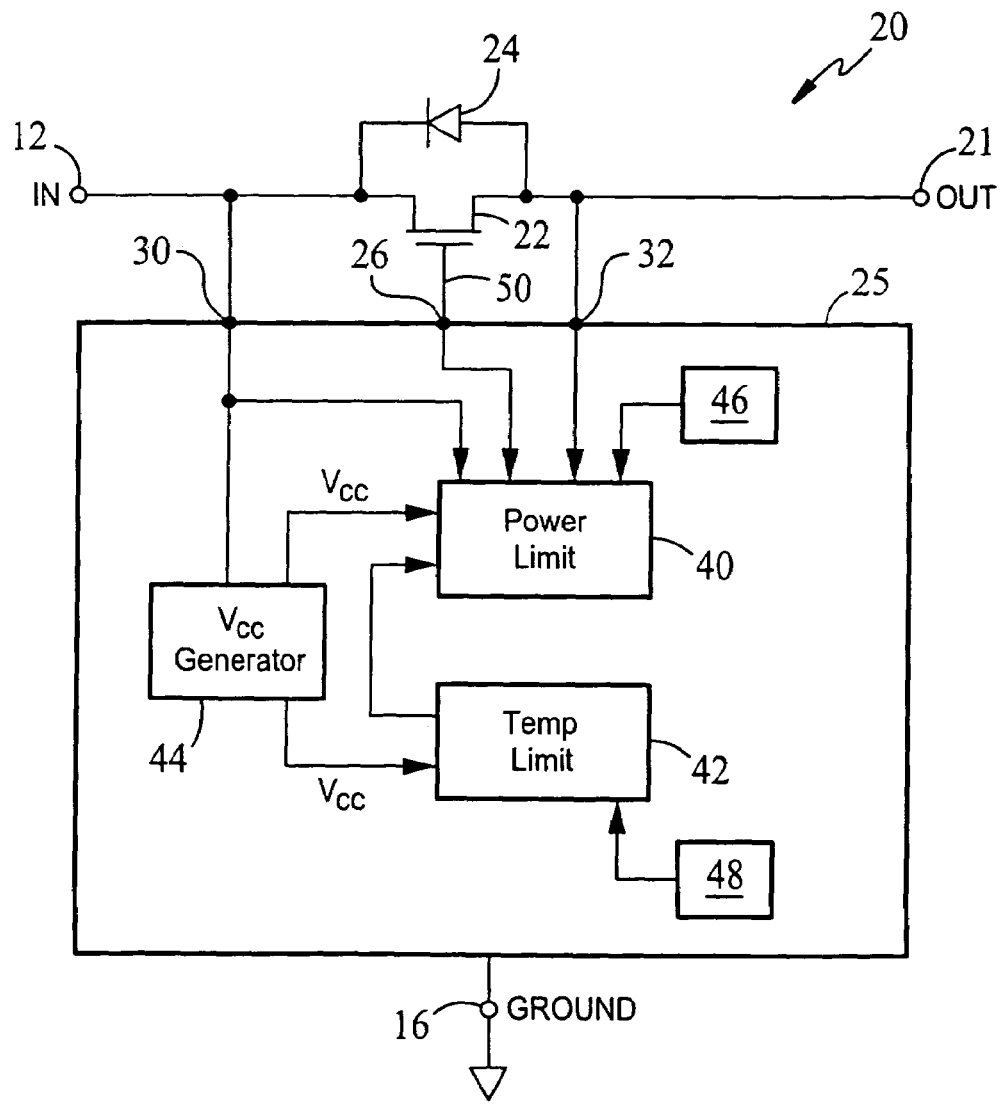

In one implementation, shown in FIG. 4, the protection component is formed as an integrated circuit 20 that includes a MOSFET 22 (and its body diode 24) and a control circuit 25 that controls the MOSFET 22 through a control terminal 26. The control circuit is grounded at the terminal 16 and is also connected to the input 12 and the output 21 through the terminals 30 and 32.

The control circuit 24 provides three primary functions using conventional approaches.

One function 40 monitors the amount of power being delivered through the output 21 to quickly detect when a fault in the primary circuit is causing more than a threshold amount of current to be drawn through the output 21. One way to detect the current is by measuring the voltage across the resistance channel represented by the MOSFET.

A second function 42 monitors the temperature of the component 20 against a threshold temperature maximum, to protect component 20 against damage.

A third function 44 generates Vcc from the voltage at the input terminal using a conventional charge pump circuit. The voltage Vcc is used both to power the control circuit 25 and to drive the gate 50 of the MOSFET. The MOSFET is either switched open quickly when either the detected current being drawn or the detected temperature exceed the preset limits 46, 48, or the MOSFET is controlled to limit the current or temperature in accordance with some continuous control strategy (e.g., the current may be controlled to be a constant current or "foldback current limiting" may be used).

If the "switched" protection approach is used (i.e., the MOSFET is switched open when a fault condition is detected) then several components 20 may be paralleled to provide protection at higher current and power levels. One way to parallel the components is simply to connect their inputs 12 and outputs 21 (FIG. 4) together (as illustrated in FIG. 2). In this case, differences in current limit thresholds will result in one device opening first on occurrence of an overcurrent condition. This will then result in other devices carrying higher current, which will cause their overcurrent thresholds to be exceeded. Alternatively, a "parallel" pin may be provided on each component 20 (not shown in the figures) which would connect to a similar pin on all other units. Any unit which senses an overcurrent condition would open its MOSFET and deliver a signal to its parallel pin; the signal would be sensed at the parallel pin of all other units, causing them to open their MOSFETs.

In one example, the component 20 can handle any positive input voltage up to 30 volts and an output current up to a maximum of 10 Amps, and the switch is a 5 milliohm, 30 Volt MOSFET.

Another example would handle negative voltages instead.

Component 20 could be fabricated as a single integrated circuit or as an integrated circuit controller and a separate MOSFET. In either case the parts could be packaged using MLP techniques in a tiny surface mount component and made available for a cost as low as $1.

Smart OR'ing Diode

Figure 5:
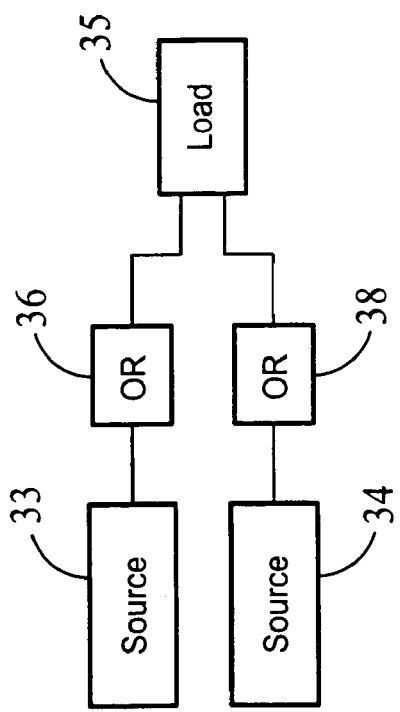

Another type of electronic component that provides a different protective service function is shown in FIG. 5. A load 35 is powered by two (or more) redundant power sources 33, 34. In the absence of the OR'ing circuits 36, 38, certain types of failures (such as a short-circuited output) in one or the other of the sources would cause the output voltage delivered to the load to drop and power delivery to the load to be interrupted. The goal of the OR'ing circuits 36, 38 is to enable a single one of the sources 36, 38 to provide uninterrupted delivery of power to the load under such circumstances.

Figure 6:
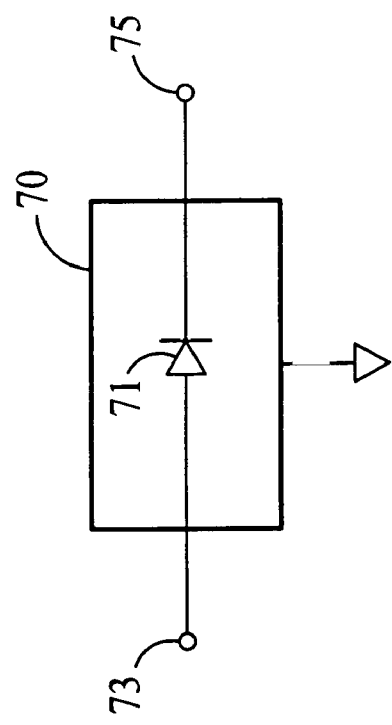

As shown in an idealized form in FIG. 6, the OR'ing function may be achieved by a diode 71 in a device that has an input terminal 73 to connect to one of the sources and an output terminal 75 to connect to the load. Conventional bipolar or Schottky diodes are commonly used for this purpose. However, the voltage drops in such devices (e.g., 0.7 V or more for a bipolar and 0.4 V or more for a Schottky) may represent significant power loss when the voltage being delivered to the load is relatively low (e.g., 2.2 V or 5V).

Figure 7:
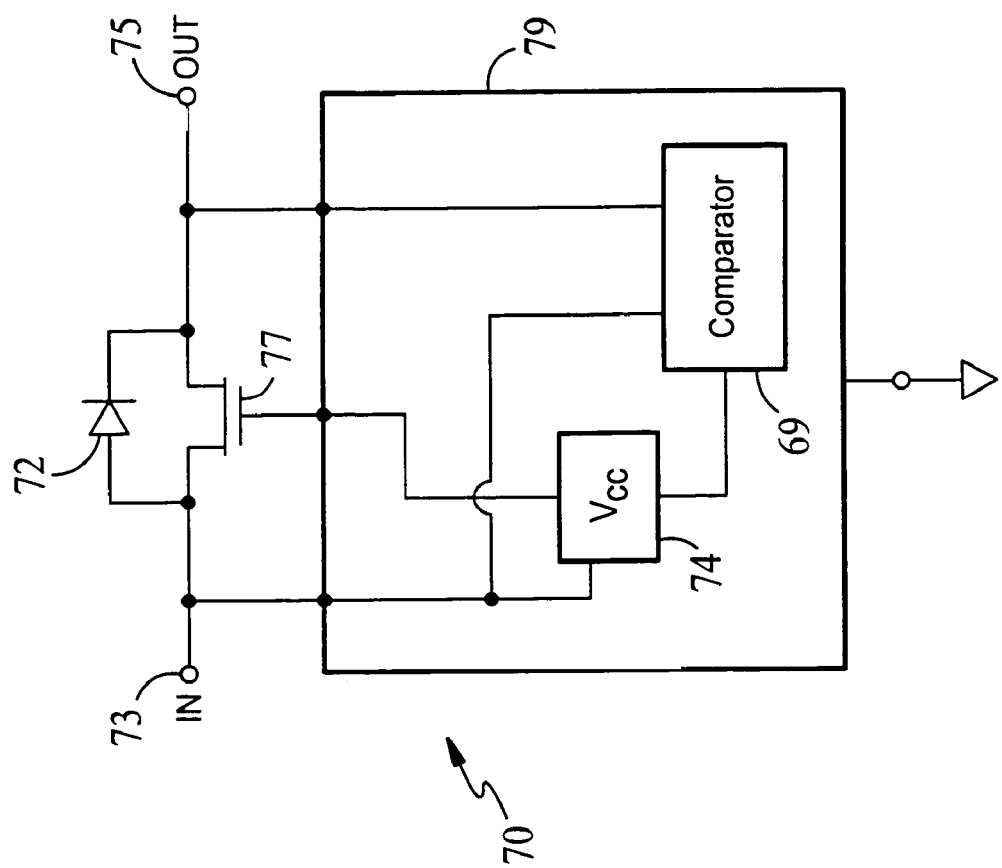

One implementation of a circuit 70 to provide the OR'ing function, shown in FIG. 7, includes a MOSFET 77 (and its body diode 72) and a control circuit 79 that controls the gate of the MOSFET. The input source is connected to terminal 73 and the load is connected to terminal 75. If the source that is connected to the input 73 fails, to prevent current from flowing backward through the MOSFET, the control circuit 79 detects the condition and turns off the MOSFET. The OR'ing diodes of other sources that are connected to the same load do not shut off and their sources cooperate to continue to provide all of the power needed by the load.

For this purpose, the control circuit has two functional elements that use conventional approaches. As in FIG. 4, a Vcc generation element 74 accepts power from the load connection 75 and uses it to generate Vcc both to power the control circuit and to drive the gate of the FET (by connecting to the load, the control circuit, e.g., control circuit 36, will continue to operate even if its input source, e.g., source 33, becomes inoperative, provided that at least one operating source is able to provide power to the load via it own OR'ing diode). A comparator 69 compares the voltages at terminals 73, 75. When the voltage at terminal 75 is higher, a condition that would otherwise drive current backward through the circuit, the MOSFET is quickly shut off. Vcc continues to be generated to keep the control circuit powered. The polarity of the body diode 72 of the FET 77 enables power to be delivered from the input 73 to the output 75 should the control circuit be inoperative, e.g., during the time period after initial power-up when Vcc has not risen to its final value).

As in the other components described above and below, the smart OR'ing diode component can be fabricated using discrete or integrated circuit techniques and packaged in a small, low cost MLP package for commercialization.

As shown in FIG. 2 (which also applies generically to a wide range of different kinds of components 14 including others described above and below), multiple units of the smart OR'ing diode (at any chosen level of granularity) can be connected in parallel between an input source and an output load to achieve higher current capacity. The current is shared naturally by the MOSFETs.

Short-Circuit Protection with OR'ing Diode

As shown in FIGS. 8 through 11, the service functions of the OR'ing diode component and the short-circuit protection circuit can be combined in a single commercial component.

Figure 10:
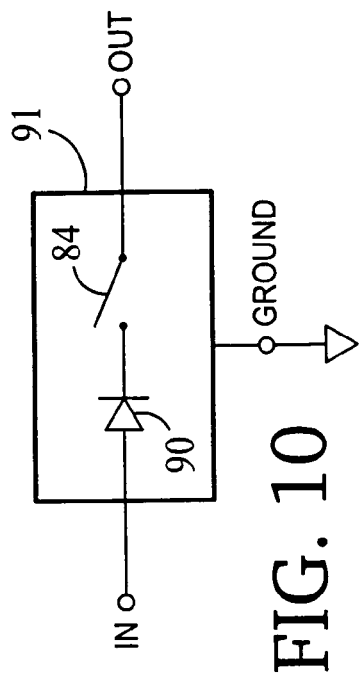
Figure 8:
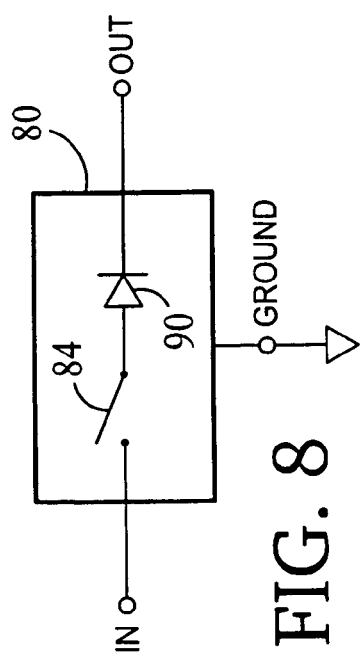

FIGS. 8 and 10 show idealized components 80, 89 in which the diode and protection elements 84, 90 are respectively connected in different orders. Functionally the two approaches are essentially the same. But they provide different fabrication opportunities and burdens.

Figure 11:
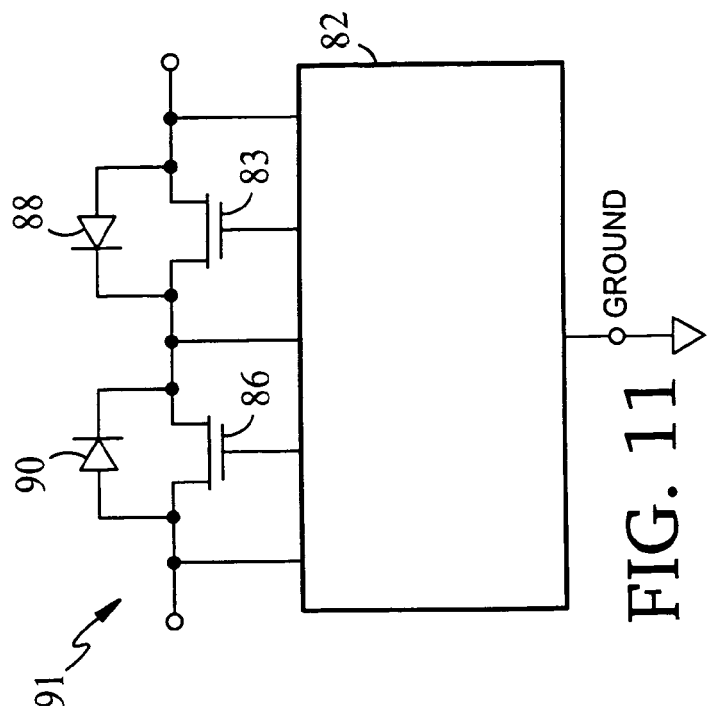
Figure 9:
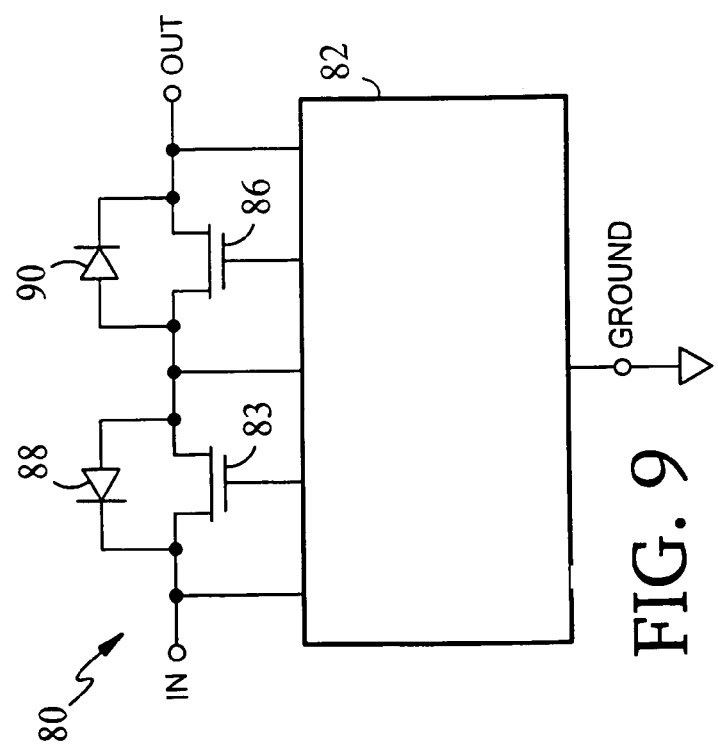

FIGS. 9 and 11 show implementations of the respective components, in both cases using two MOSFETs 83, 86 (and their body diodes 88, 90) connected in series. In both cases, the gates of the MOSFETs are managed by a control circuit 82 that includes the same kinds of functional elements shown earlier for the OR'ing diode and the protection circuit.

In FIGS. 8 and 9, the protection function is on the source side of the OR'ing diode function and the MOSFETs are connected in a common source configuration. The control circuitry is simpler than in FIGS. 10 and 11 because (in FIGS. 8 and 9) the two gates can be driven in a parallel mode rather than separately. But the fabrication of a fully-integrated (i.e., the FETs and control circuitry integrated onto a common semiconductor die) version of the component of FIGS. 8 and 9 is more complex than that of FIGS. 10 and 11 because the drains of the two MOSFETs must be isolated from each other.

Voltage Shock Absorber

Figure 12:
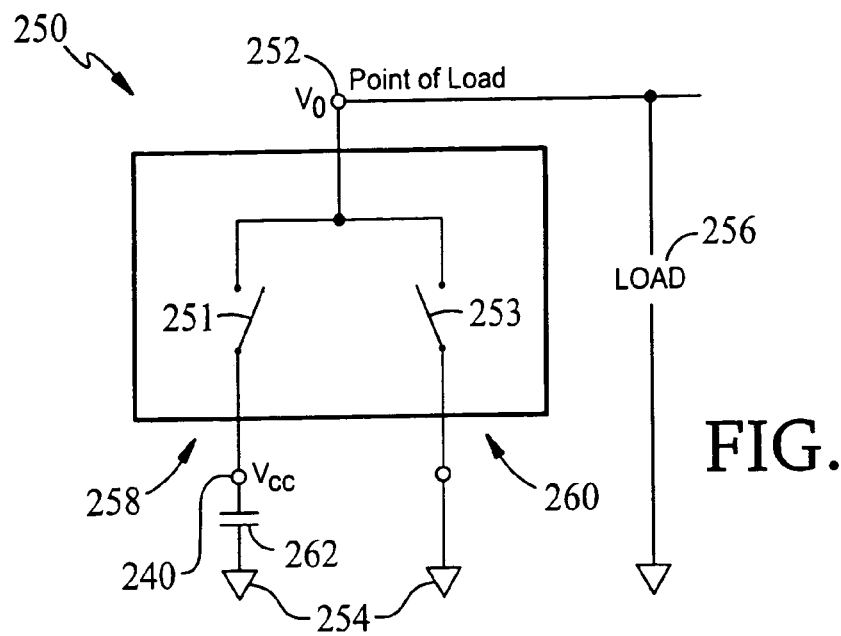
Figure 13:
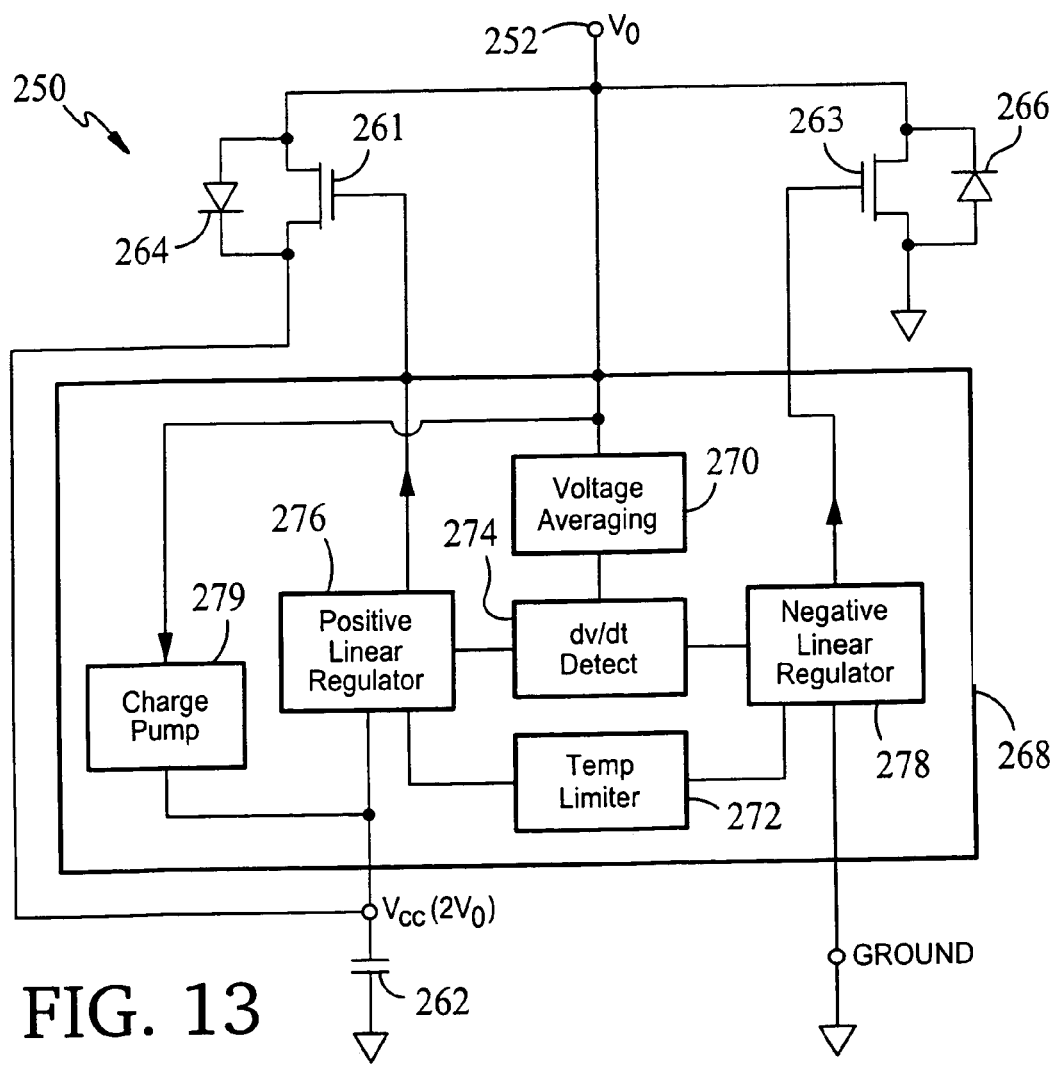

Another protection component in the form of a voltage shock absorber 250 is illustrated as an ideal element in FIG. 12 and in an implementation in FIG. 13.

The goal of component 250 is to "shock absorb" against changes in a voltage (either increases or decreases) between a point of load 252 and ground 254 to prevent damage to or failure of operation of a load 256. The component 250 is responsive to transients which might cause the load voltage to go above or below pre-defined limits.

Component 250 has two sub-circuits 258, 260 that include controlled elements 251, 253, respectively. One sub-circuit 260 is arranged to quickly pull down the voltage at the point of load toward ground. The other side 258 is arranged to quickly pull up the point of load toward a voltage that is approximately double the nominal voltage V0 of the point of load.

The 2*V0 voltage is achieved by charge pumping in a conventional manner into a capacitor 262.

As shown in FIG. 13, the controlled elements can be implemented as MOSFETs 261, 263 (with their body diodes 264, 266). Functional elements of the control circuit 268 include a voltage averaging function 270 that averages the load voltage over time as a way to calibrate the circuit for later control of the gates of the MOSFETs. A temperature limiter 272 forces a shutoff of the MOSFET if it gets too hot. A dv/dt detector 274 watches for sharp changes up or down in the point of load. Positive and negative linear regulators 276, 278 provide very rapid control of the FETs to achieve the shunting up or down of the point of load.

A conventional charge pump 279 accepts V0 as an input and charges capacitor 262 to approximately 2*V0. The charge pump voltage is the input to positive linear regulator 276 and to the drain of MOSFET 261. The feedback loop comprising the positive linear regulator 276 and MOSFET 261 seeks to counteract any negative rate-of-change in the voltage V0. Transients having a negative rate-of-change with respect to the average value of V0 are detected by the dv/dt detector 274, which causes the positive linear regulator 276 to drive the gate of MOSFET 261, thereby delivering energy to the load from capacitor 262 as a means of counteracting the transient. A more rapid rate-of-change of V0 will result in a faster rate of delivery of energy to the load.

The feedback loop comprising the negative linear regulator 278 and MOSFET 263, with input from dv/dt detector 274, operates in a complementary manner with respect to dips in load voltage V0. Transients having a positive rate-of-change with respect to the average value of V0 are detected by the dv/dt detector 274, which causes the negative linear regulator 278 to drive the gate of MOSFET 263, thereby diverting energy away from the load to ground to counteract the transient. A more rapid rate-of-change of V0 will result in a faster rate of diversion of energy away from the load.

Multiple similar shock absorber components can be connected in parallel (with any desired level of granularity) between the point of load and ground to increase the total "shock absorbing" capacity of the system. For example, if the "pulldown" thresholds of three parallel shock absorbers are 5.1, 5.2, and 5.3 volts, respectively, and if the voltage at the point of load rises to 5.1 volts, the first shock absorber will start to draw current. If that unit alone can successfully absorb the shock, then 5.2 volts is never reached, and the other two shock absorbers are not triggered. Otherwise, the voltage will continue to rise and, eventually, the second shock absorber, and, if needed, the third one, will be triggered.

Efficient Shock Absorber

Figure 14:
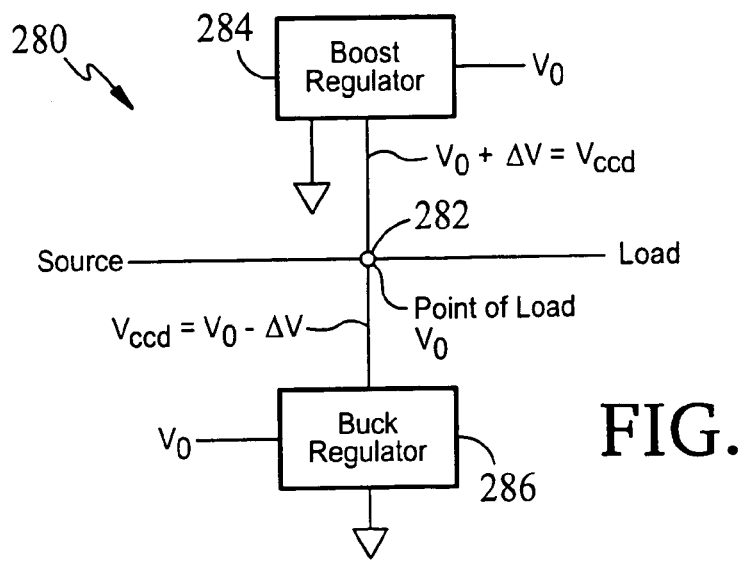
Figure 15:
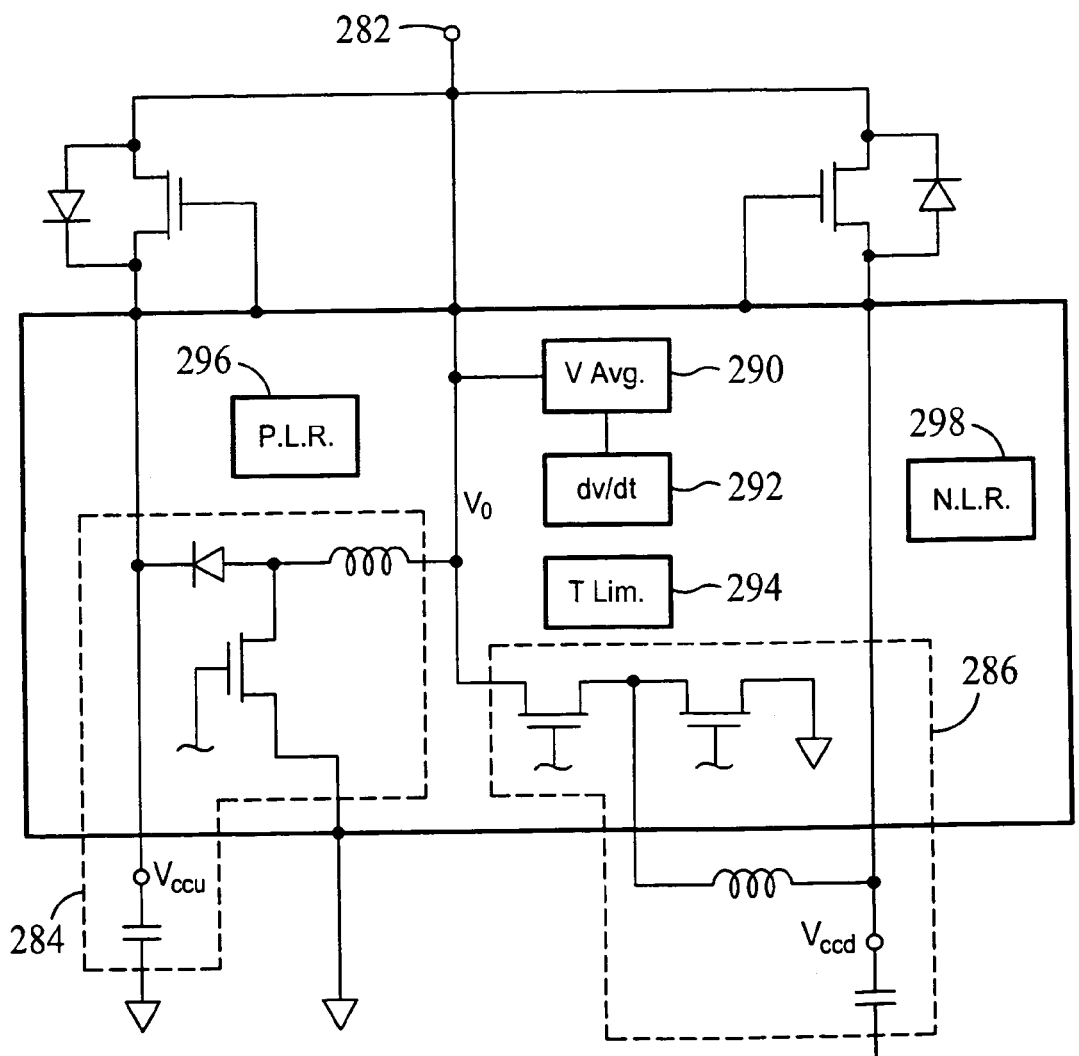

The efficient shock absorber 280 of FIGS. 14 and 15 has the same goal as in FIGS. 12 and 13, but uses a more complex circuit to operate more efficiently. Instead of pulling up by connecting the point of load 282 to a 2*V0 source and pushing down by connecting to ground, the circuit includes a boost regulator 284 to pull up to V0 +delta*V0 and a buck regulator 286 to pull down to V0 −delta*V0. This reduces the difference in voltage between the point of load and the pullup and pulldown points, which reduces the amount of energy loss in the circuit.

In general, if the worst case current transient which must be absorbed is X Amps, then the MOSFET should be selected to have a minimum controllable value of drain-to-source resistance (the ON resistance) of delta*V0 divided by X. For example, if delta*V0 is 50 millivolts and the maximum current transient is 10 Amps, then the ON resistance of the MOSFET should be less than 5 milliohms.

In FIG. 15, the control circuit has other control elements that are similar to the ones shown in FIG. 13, including voltage averaging 290, dv/dt detection 292, temperature limiter 294, and positive and negative linear regulators 296, 298.

Simple and Efficient Shock Absorber

Figure 16:
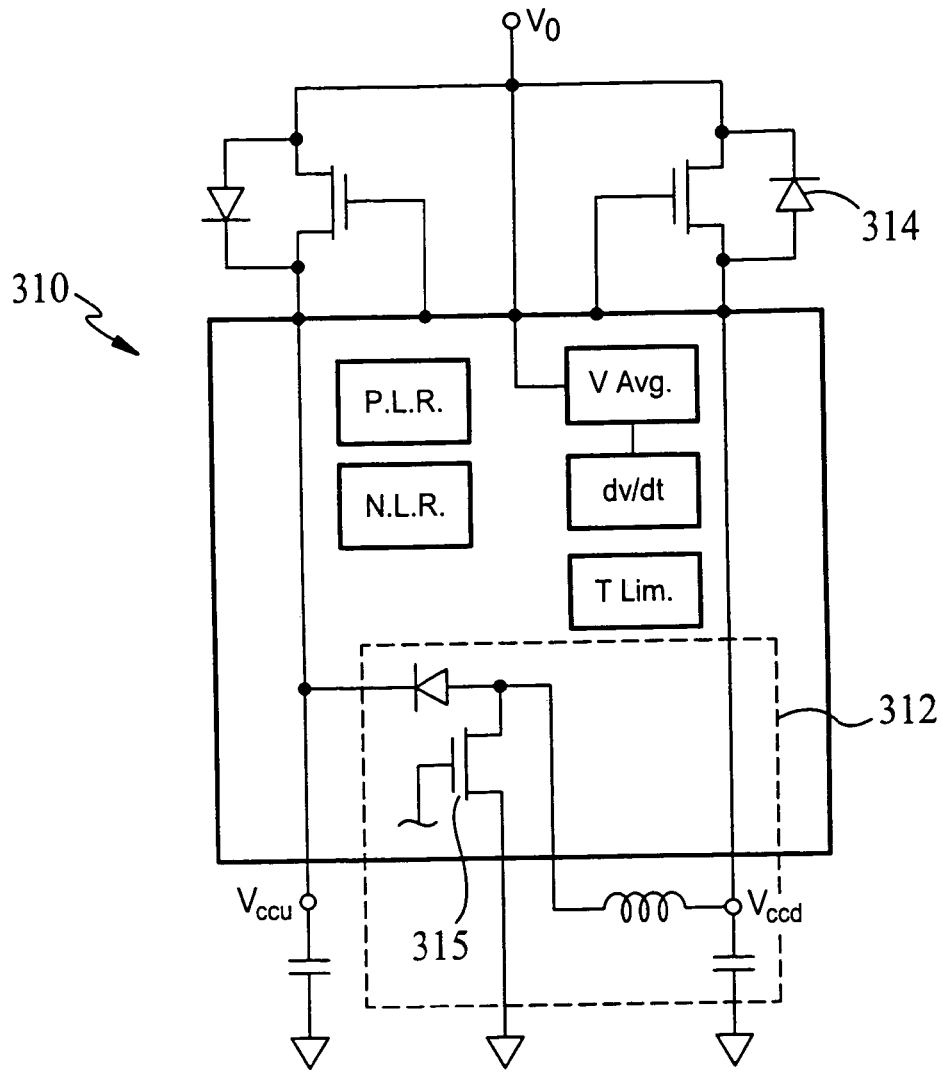

The component 310 of FIG. 16 achieves a compromise between the simplicity of the component of FIG. 13 and the efficiency of the component of FIG. 15.

The component 310 is simpler than the one in FIG. 15, for it uses a single boost converter 312. The other control circuit elements are similar to the ones in FIG. 15. Note that the diode 314 is poled differently than the body diodes in FIGS. 13 and 15. This allows the circuit to start up when power is initially applied. Thereafter, the value of Vccu may be set to any value above V0, but the minimum value of Vccd will be limited to be above (V0 −Vd), where Vd is the drop in diode 314 (which may be a discrete diode or the body diode of the MOSFET). T The circuit of FIG. 16 is more efficient than the circuit of FIG. 13, but is more complex and expensive, and is simpler and lower cost than the circuit of FIG. 15. but is less efficient.

Filter Components

Another class of components that use controlled elements and control circuits provides filtering service functions to primary circuits.

Active Output Filter

Figure 17:
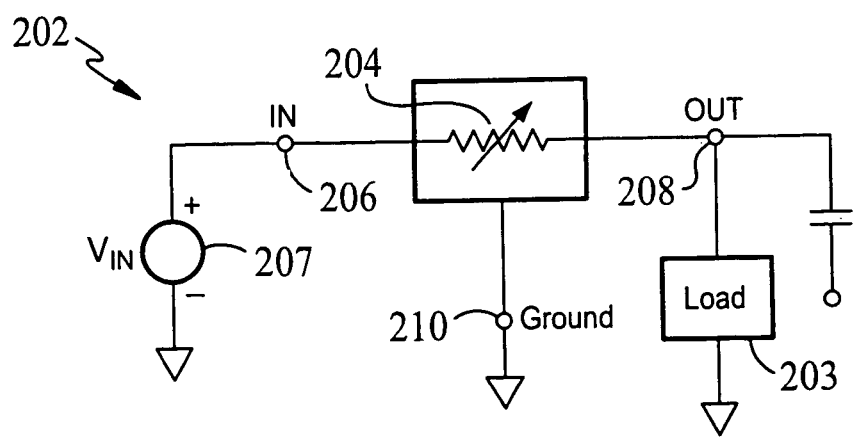

As shown in FIG. 17, for example, a component 202 includes an idealized filtering element 204 connected between a unipolar, but non-ideal, input voltage source, Vin 207, connected to input terminal 206, and a unipolar output load 203 connected to output terminal 208. A third terminal 210 is grounded.

The goal is to prevent ripple 209 (FIG. 18) generated by the input voltage source 207 from appearing at the load by controlling the filtering element in a manner to offset the ripple of the input voltage source.

Figure 18:
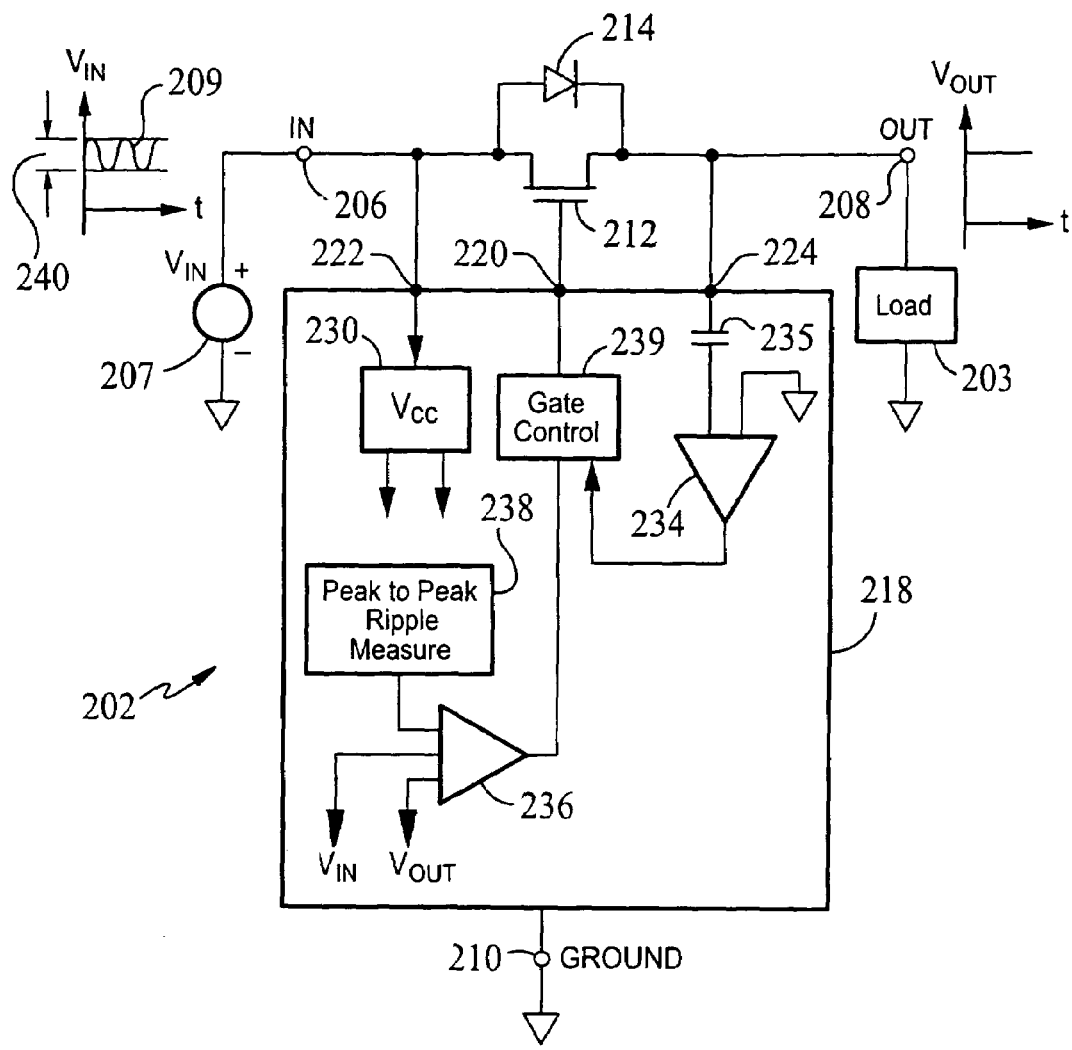

As shown in FIG. 18, an implementation of the active filter component 202 includes a MOSFET series pass element 212 (with its body diode 214) and a control circuit 218 that controls the conductivity of the MOSFET through a control terminal 220. The control circuit is grounded at the terminal 210 and is connected to the input 208 and the output 208 through the terminals 222 and 224.

The control circuit 218 provides five primary functions using conventional approaches:

a. an error amplifier 234 for comparing the AC ripple component of Vout (as indicated by DC blocking capacitor 235) to an essentially zero voltage AC reference.
b. a circuit 238 for measuring the peak-to-peak ripple of the input source.
c. a headroom adjustment circuit 236, explained below.
d. a gate control circuit for controlling the AC and DC voltage across the MOSFET, as explained below.
e. a Vcc circuit 230 (e.g., a charge pump) for powering the circuitry in control circuit 218.

Using these functional elements, the gate is controlled in a two-layer control regime.

In one layer, called "headroom adjustment" or "adaptive headroom", the gate of the MOSFET is controlled so that the DC voltage level across the MOSFET series pass element 212 is regulated to be as small as it can be while still spanning the peak-to-peak range 240 of the ripple of the input source. This reduces average power losses in the circuit while maintaining sufficient dynamic range to cancel the ripple. Headroom adjustment is accomplished by measuring the peak-to-peak ripple at the input (using peak-to-peak ripple measuring circuit 238), comparing the peak-to-peak ripple to the average voltage across the MOSFET (i.e., the difference between the average value of Vin and the average value of Vout) in error amplifier 236, and closing a feedback loop, via gate control circuit 239, to control the average voltage across the MOSFET 212 to be slightly above the measured peak-to-peak voltage. This process occurs continuously: the average value of MOSFET voltage, over a time span which is relatively large compared to the time scale over which the variations in the ripple take place, is adaptively adjusted as the envelope of the peak-to-peak ripple changes.

In a second layer of the control regime, error amplifier 234 compares the AC ripple component of Vout (as indicated by DC blocking capacitor 235) to an essentially zero voltage AC reference point and generates an error signal which controls the gate of the MOSFET, via gate control circuit 239, so that the AC voltage across the MOSFET 212 exactly (in an ideal world) offsets the input source ripple variations.

Active Input Filter

Figure 19:
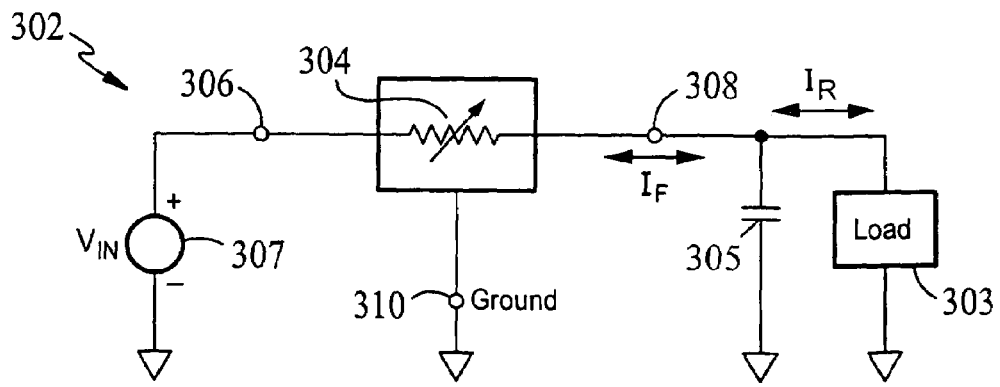

FIG. 19 illustrates an idealized component, an active input filter 302, which is intended to prevent ripple currents, IR, generated by a load 303 (e.g., the input of a DC-DC converter) from being reflected back into the input source 307. In the figure, a component 302 includes an idealized filtering element 304 connected between a unipolar, but non-ideal, input voltage source, Vin 307, connected to input terminal 306, a unipolar output load 303 connected to output terminal 308, and a bypass capacitor 305 across the load. A third terminal 310 is grounded. The active input filter may be thought of as operating at relatively high frequencies relative to the frequency content of the input source. For example, if the load is a DC-DC converter operating at a conversion frequency of 300 KHz, the active input filter might act on the first three or four harmonics of the conversion frequency. Low frequency variations in the input source, such as 100 or 120 Hz ripple deriving from rectification of an AC utility source, will be below the frequency range of operation of the active input filter. Thus, the source may be considered to be a DC source.

The goal is to prevent ripple generated by the load 309 from appearing at the input source 307 by controlling the filtering element 304 in a manner which forces the currents to flow in the bypass capacitors 305, thereby (in an ideal world) preventing any reflected ripple current IF from flowing back into the input source.

Figure 20:
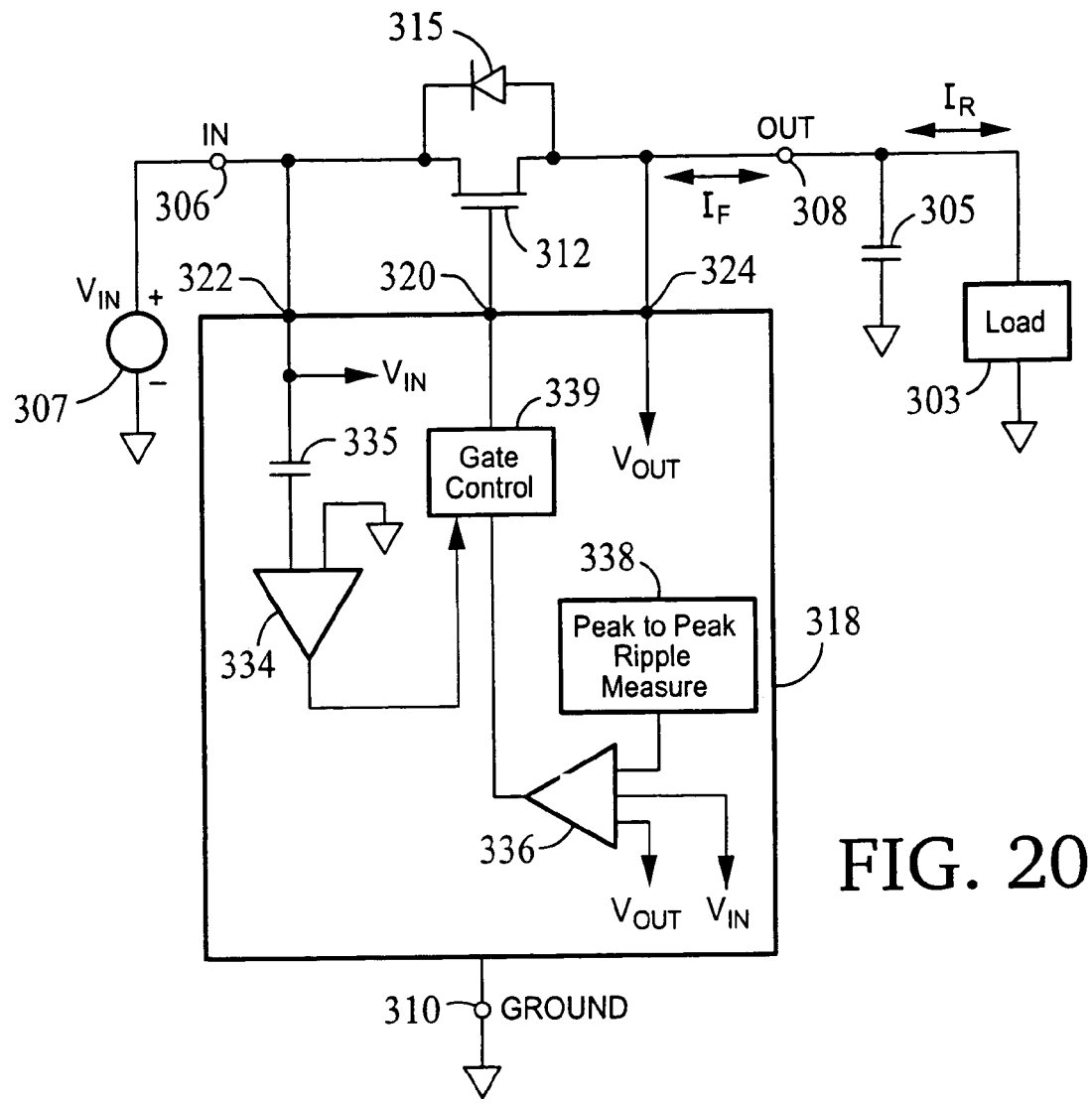

As shown in FIG. 20, an implementation of the active input filter component 302 includes a MOSFET series pass element 312 (with its body diode 315) and a control circuit 318 that controls the conductivity of the MOSFET through a control terminal 320. The control circuit is grounded at the terminal 310 and is connected to the input 308 and the output 308 through the terminals 322 and 324.

As illustrated, the control circuit 318 provides the same primary functions described above for the output filter of FIG. 18, using conventional approaches:

a. an error amplifier 334 for comparing the AC ripple component of Vin to an essentially zero voltage AC reference.
b. a circuit 338 for measuring the peak-to-peak ripple of the input source.
c. a headroom adjustment circuit 236, explained below.
d. a gate control circuit for controlling the AC and DC voltage across the MOSFET, as explained below.
e. a Vcc circuit (e.g., a charge pump) 330 for powering the circuitry in control circuit 318.

Using these functional elements, the gate is controlled in a two-layer control regime.

In one layer, called "headroom adjustment" or "adaptive headroom", the gate of the MOSFET series pass element 312 is controlled so that the DC voltage level across the MOSFET is regulated to be as small as it can be while still spanning the peak-to-peak range 240 of the ripple across the bypass capacitors 305. This reduces average power losses in the circuit while maintaining sufficient dynamic range to cancel the reflected input ripple current, IF. Headroom adjustment is accomplished by measuring the peak-to-peak ripple at the output (using peak-to-peak ripple measuring circuit 338), comparing the peak-to-peak ripple to the average voltage across the MOSFET (i.e., the difference between the average value of Vin and the average value of Vout) in error amplifier 336, and closing a feedback loop, via gate control circuit 339, to control the average voltage across the MOSFET 312 to be slightly above the measured peak-to-peak voltage. This process occurs continuously: the average value of MOSFET voltage, over a time span which is relatively large compared to the time scale over which the variations in the ripple take place, is adaptively adjusted as the envelope of the peak-to-peak ripple changes.

In one example of a second layer of the control regime, error amplifier 334 compares the AC ripple component of Vin (as indicated by DC blocking capacitor 335) to an essentially zero voltage AC reference point and generates an error signal which controls the gate of the MOSFET, via gate control circuit 239, so that the AC voltage across the MOSFET 212 exactly (in an ideal world) offsets the output source ripple variations. By this means, IF is effectively eliminated.

Figure 21:
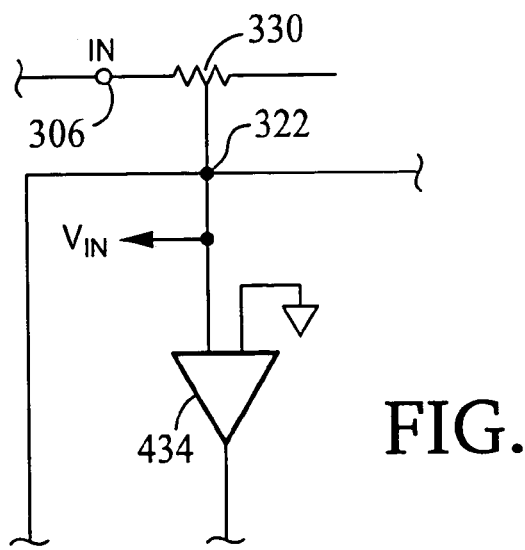

In another example of the second layer of control, the AC error amplifier 334 of FIG. 20 is replaced with a current sense amplifier 434 (shown in FIG. 21). The current sense amplifier compares the current IF to an essentially zero current reference point and generates an error signal which controls the gate of the MOSFET, via gate control circuit 239, so that the conductivity of the MOSFET 212 exactly (in an ideal world) cancels the flow of AC current, IF.

Other implementations are within the scope of the following claims. For example, the components may comprise an integrated circuit for control functions and separate MOSFET devices or one or more MOSFETs may be integrated onto the same die as the control circuitry. The MOSFETs in the active filters may be placed in either the positive or the negative current path. All components may be implemented for use with positive or negative sources.

The invention claimed is:

1. Apparatus for providing a filtering function to an external circuit comprising
a controlled element,
a control element adapted to control an average voltage across the controlled element as a function of variations in a signal that is to be filtered and a requirement for providing the filtering function.

2. The apparatus of claim 1 wherein the external circuit comprises a power converter, and the filtering function comprises ripple filtering of the power converter.

3. The apparatus of claim 2 wherein the filtering function comprises attenuating the ripple generated at an output of the converter.

4. The apparatus of claim 2 wherein the filtering function comprises attenuating the ripple generated at an input of the converter.

5. The apparatus of claim 1 wherein the controlled element comprises a FET the conductivity of which is controlled to provide the filtering function.

6. The apparatus of claim 1 wherein the control element includes elements adapted to detect a component of ripple at a terminal of the apparatus.

7. The apparatus of claim 6 wherein the controlled element comprises a MOSFET, the variations comprise a peak-to-peak ripple component of the signal, and the requirement comprises the average voltage across the MOSFET being greater than the peak-to-peak ripple.

8. The apparatus of claim 6 wherein the filtering function is ripple attenuation and the control element is further adapted to control voltage variations across the FET to effect the ripple attenuation.

9. The apparatus of claim 1 further comprising terminals coupled to the apparatus and adapted for surface mounting on a circuit board.

10. The apparatus of claim 1 wherein the controlled element and the control element are formed as a circuit integrated on a single substrate.

11. A method comprising
sensing variations in a signal that is to be filtered; and adaptively setting an average voltage across a series pass element in an active filter based upon the sensed variations and a requirement for providing a filtering function.

12. The method of claim 11 wherein the sensing comprises measuring peak-to-peak variations in the signal to be filtered.

13. The method of claim 12 wherein the setting further comprises setting the average voltage to be slightly greater than the peak-to-peak variations.

14. The method of claim 13 wherein the filtering function is attenuation of the variations and the setting further comprises minimizing the average voltage.

15. The method of claim 13 wherein the setting comprises using a time scale for the average voltage that is large compared to a time scale within which the variations occur.

16. Apparatus comprising
a filter circuit including a controlled element connected in series between an input connection and an output connection, circuitry adapted to provide a filtering function, and
a control circuit adapted to sense variations in a signal that is to be filtered and to control an average voltage across the controlled element as a control function of the variations and of a requirement for providing the filtering function.

17. The apparatus of claim 16 wherein the filtering function is attenuation of the variations and the requirement comprises maintaining the average voltage at a level greater than a peak-to-peak value of the variations.

18. The apparatus of claim 16 wherein the filtering function is attenuation of the variations and the requirement comprises maintaining the average voltage at a level greater than a peak-to-peak value of the variations and minimizing the average voltage.

19. The apparatus of claim 18 wherein the control circuit uses an average for the voltage across the controlled element having a time scale that is large compared to a time scale within which the variations occur.

20. The apparatus of claim 17 wherein the signal is a current flowing through the output connection of the filter and the variations are a ripple component of the current.

21. The apparatus of claim 17 wherein the signal is an output voltage at the output connection of the filter and the variations are a ripple component of the output voltage.

22. The apparatus of claim 17 wherein the signal is an input voltage at the input connection of the filter and the variations are a ripple component of the input voltage.

23. The apparatus of claim 17 wherein the control circuit is further adapted to control a conductivity of the controlled element to provide the filtering function.

24. The apparatus of claim 19 wherein the control circuit is adapted to control voltage variations across the controlled element to effect the ripple attenuation.

25. The apparatus of claim 23 further comprising a reference connection and wherein the input connection, the output connection, and the reference connection further comprise terminals adapted for surface mounting on a circuit board.

26. The apparatus of claim 23 wherein the controlled element comprises a MOSFET and MOSFET and the control circuit are formed as a circuit integrated on a single substrate.

* * * * *